(12) United States Patent
Chuang

(10) Patent No.: US 7,121,597 B2
(45) Date of Patent: Oct. 17, 2006

(54) BICYCLE-HOLDING APPARATUS CONCEALABLE IN BUMPER SHELL

(76) Inventor: Louis Chuang, 2F-2, No. 91, Section 4 Mei Chuan East Road, Pei Tun District, Taichung (TW)

( * ) Notice: Subject to any disclaimer, the term of this patent is extended or adjusted under 35 U.S.C. 154(b) by 53 days.

(21) Appl. No.: 10/913,647

(22) Filed: Aug. 6, 2004

(65) Prior Publication Data
US 2006/0028036 A1 Feb. 9, 2006

(51) Int. Cl.
B60R 19/48 (2006.01)
B60R 9/10 (2006.01)

(52) U.S. Cl. .................. 293/117; 293/106; 224/489; 296/37.1

(58) Field of Classification Search ............... 293/116, 293/117, 106; 296/37.1; 224/488, 489, 224/491, 924, 497, 512, 502–510, 513, 516, 224/525, 531
See application file for complete search history.

(56) References Cited

U.S. PATENT DOCUMENTS

| | | | | |
|---|---|---|---|---|
| 3,176,903 A | * | 4/1965 | Farley | 224/490 |
| 3,554,415 A | * | 1/1971 | Woods | 224/491 |
| 3,682,360 A | * | 8/1972 | Fletcher et al. | 224/491 |
| 4,674,782 A | * | 6/1987 | Helber | 293/106 |
| 4,746,263 A | * | 5/1988 | Cook | 414/543 |
| 4,759,559 A | * | 7/1988 | Moulton | 280/40 |
| 4,834,273 A | * | 5/1989 | Cimino | 224/42.21 |
| 4,929,028 A | * | 5/1990 | Underwood | 298/19 R |
| 4,961,604 A | * | 10/1990 | Kisner | 293/106 |
| 5,135,274 A | * | 8/1992 | Dodd | 293/117 |
| 5,690,260 A | * | 11/1997 | Aikins et al. | 224/505 |
| 5,810,231 A | * | 9/1998 | Kravitz | 224/532 |
| 6,196,612 B1 | * | 3/2001 | Grimes | 296/65.05 |
| 6,460,908 B1 | * | 10/2002 | Green | 293/117 |
| 6,474,715 B1 | * | 11/2002 | Fukushima et al. | 296/37.1 |
| 6,575,509 B1 | * | 6/2003 | Golden | 293/119 |
| 6,598,914 B1 | * | 7/2003 | Dixon | 293/106 |
| 6,739,613 B1 | * | 5/2004 | Aquinto et al. | 280/500 |
| 6,827,377 B1 | * | 12/2004 | Ferrigan | 293/117 |
| 6,889,880 B1 | * | 5/2005 | Albaisa et al. | 224/491 |

* cited by examiner

Primary Examiner—D. Glenn Dayoan
Assistant Examiner—Greg Blankenship
(74) Attorney, Agent, or Firm—Alan D. Kamrath; Nikolai & Mersereau, P.A.

(57) ABSTRACT

A bicycle-holding apparatus is concealable in a bumper shell. The bicycle-holding apparatus can be switched between a concealed position and an exposed position. In the concealed position, the bicycle-holding apparatus is collapsed and concealed in the bumper shell. In the exposed position, the bicycle-holding apparatus is exposed from the bumper shell and can be extended in order to hold a bicycle.

30 Claims, 17 Drawing Sheets

US 7,121,597 B2

BICYCLE-HOLDING APPARATUS CONCEALABLE IN BUMPER SHELL

BACKGROUND OF INVENTION

1. Field of Invention

The present invention relates to a bicycle-holding apparatus concealable in a car bumper shell.

2. Related Prior Art

Referring to FIG. 16, a conventional bicycle stand is carried on the tail of a car. Referring to FIG. 17, another conventional bicycle stand is carried on the top of a car. Bicycles can be supported on these conventional bicycle stands that are carried on the cars. Thus, bicycles can be loaded on the cars during long-distance trips and removed from the cars for fun, ride or storage. However, both conventional bicycle stands occupy large spaces even when they are not used to carry bicycles. In addition, they can easily tangle with miscellaneous articles. Moreover, they are not aesthetically pleasing.

The present invention is therefore intended to obviate or at least alleviate the problems encountered in the prior art.

SUMMARY OF INVENTION

According to the present invention, a bicycle-holding apparatus is concealable in a bumper shell. The bicycle-holding apparatus can be switched between a concealed position and an exposed position. In the conceal position, the bicycle-holding apparatus is collapsed and concealed in the bumper shell. In the exposed position, the bicycle-holding apparatus is exposed from the bumper shell and can be extended in order to hold a bicycle.

The primary advantage of the bicycle-holding apparatus of the present invention is that it occupies only a small volume when not used to carry bicycles. Another advantage of the bicycle-holding apparatus of the present invention is that it does not tangle with miscellaneous articles when not used to carry bicycles. Another advantage of the bicycle-holding apparatus of the present invention is that it is aesthetically pleasant when not used to carry bicycles.

Other objects, advantages and novel features of the present invention will become more apparent from the following detailed description referring to the attached drawings.

BRIEF DESCRIPTION OF DRAWINGS

The present invention will be described via detailed illustration of embodiments referring to the drawings.

DETAILED DESCRIPTION OF EMBODIMENTS

Figure 1:
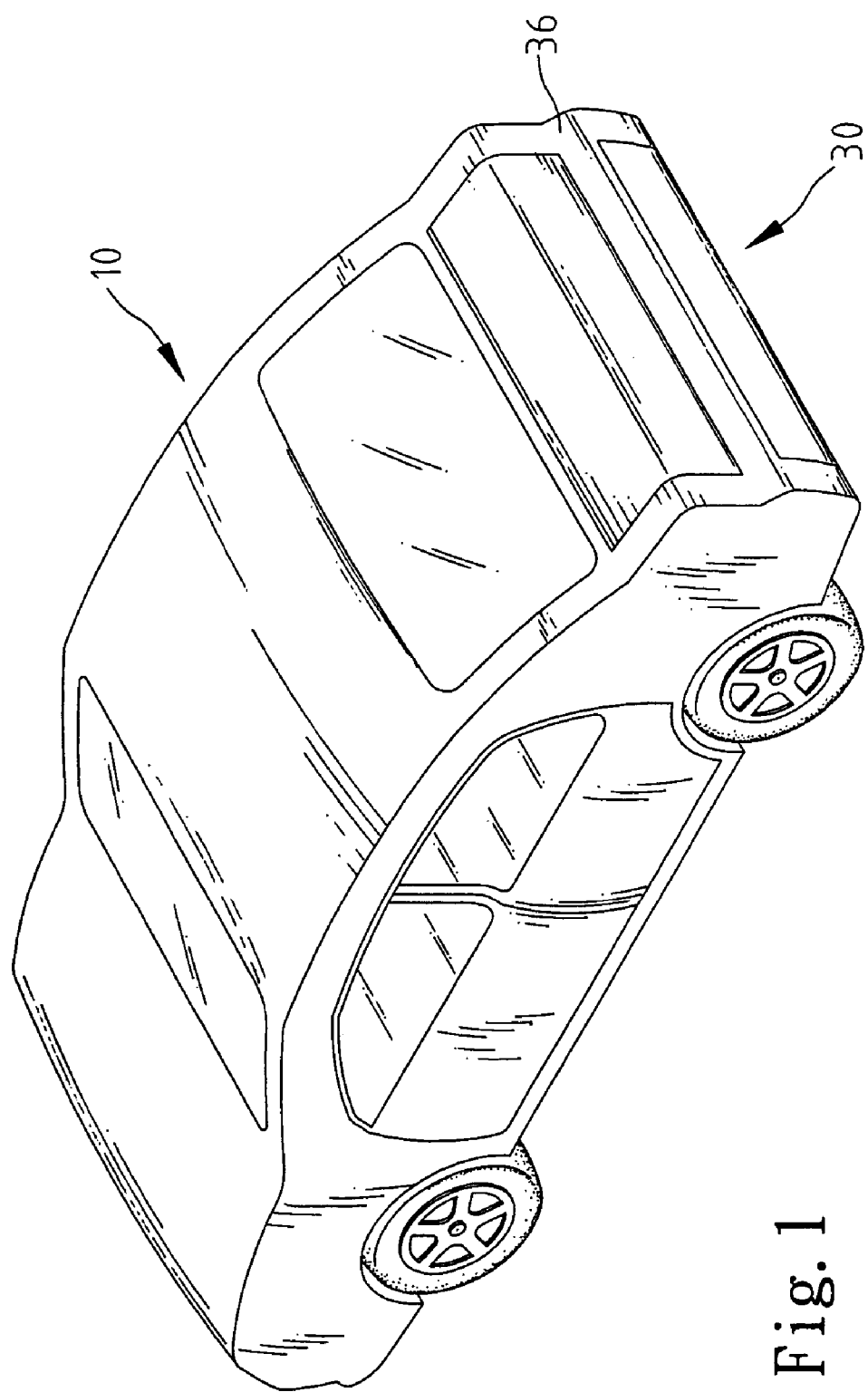
FIG. 1 is a perspective view of a car with a bumper shell in which a bicycle-holding apparatus is concealed according to the present invention.
Figure 2:
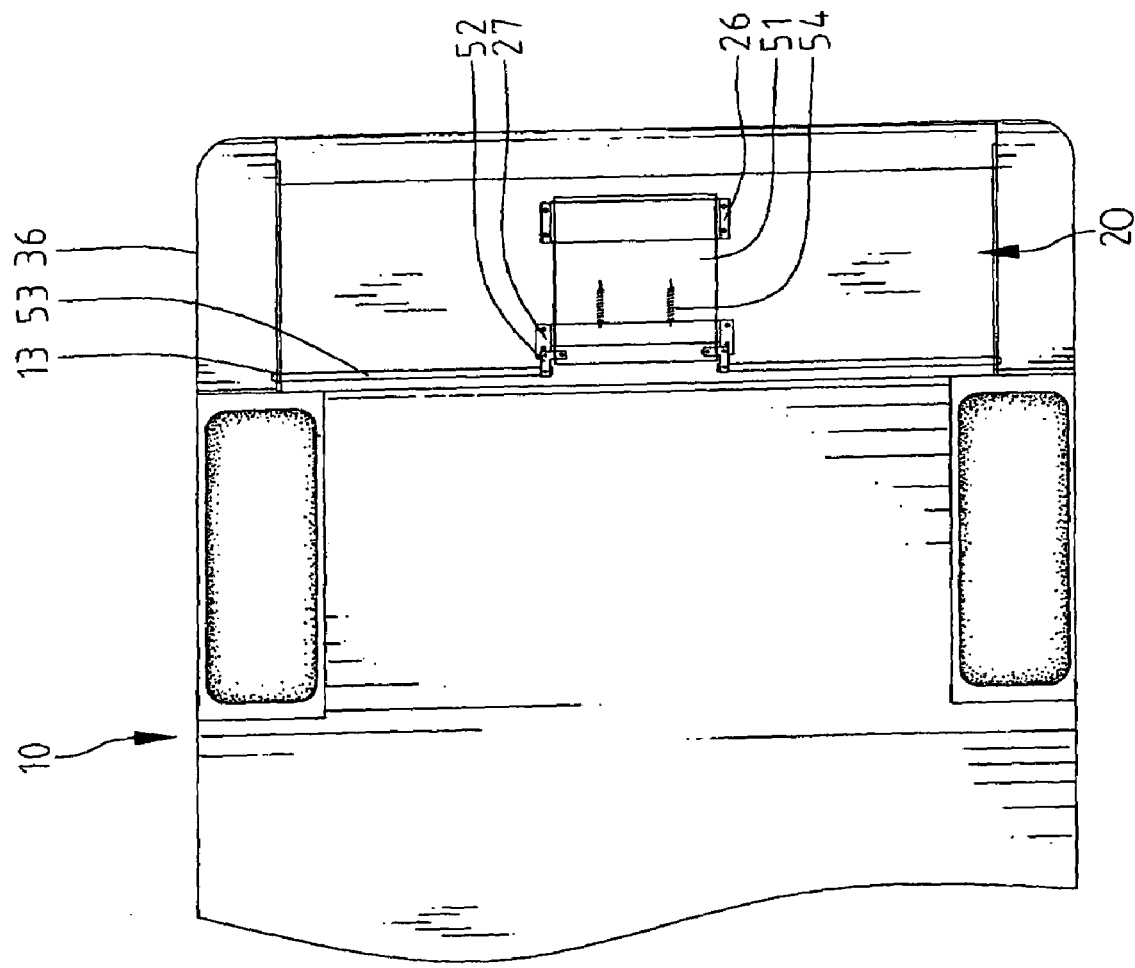
FIG. 2 is a bottom view of a rear portion of the car shown in FIG. 1.
Figure 3:
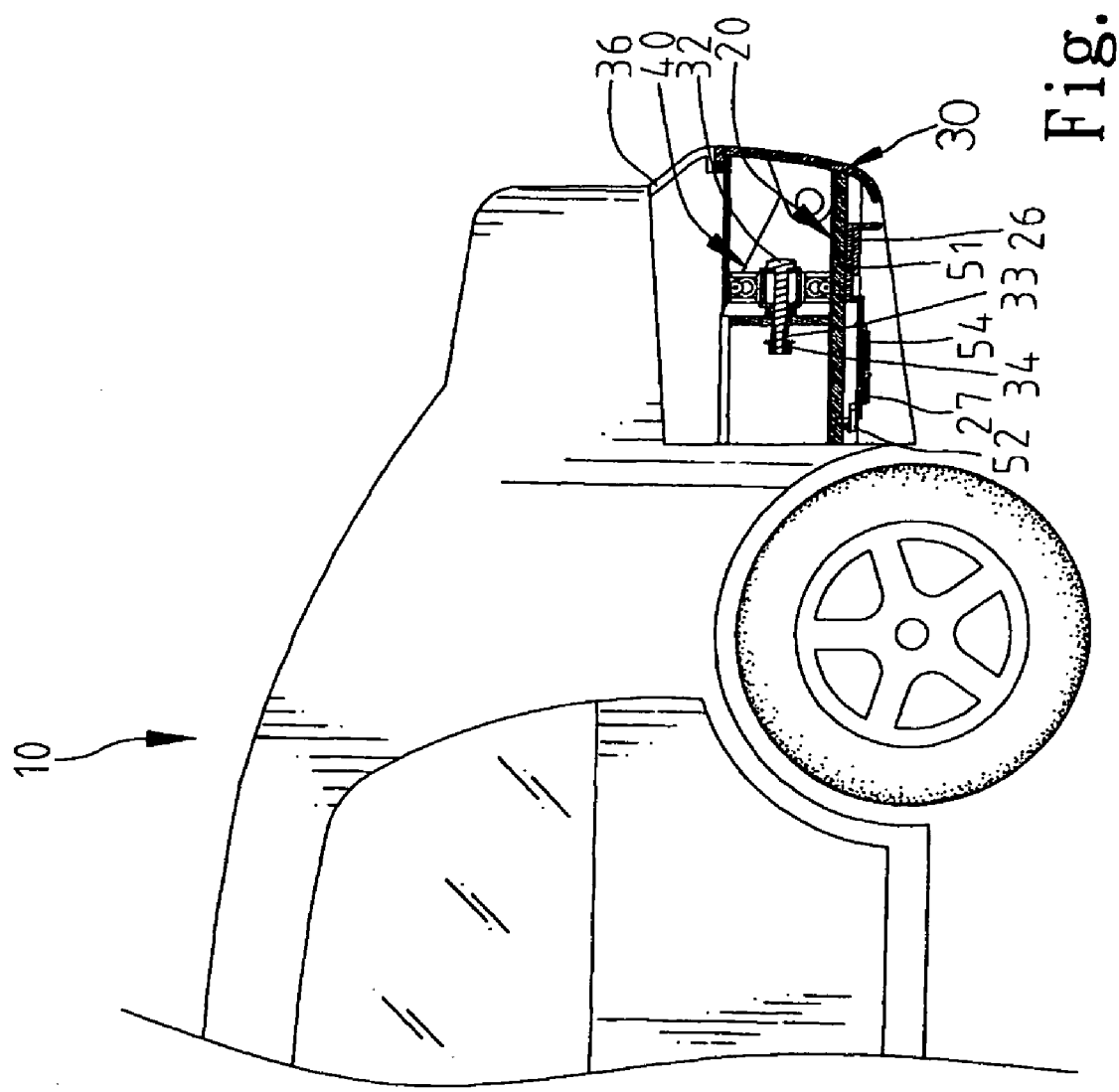
FIG. 3 is a cross-sectional view of the portion of the car shown in FIG. 2.

Referring to FIGS. 1 through 3, a bicycle-holding apparatus according to a first embodiment of the present invention is concealed in a bumper shell 36 of a car 10.

Figure 4:
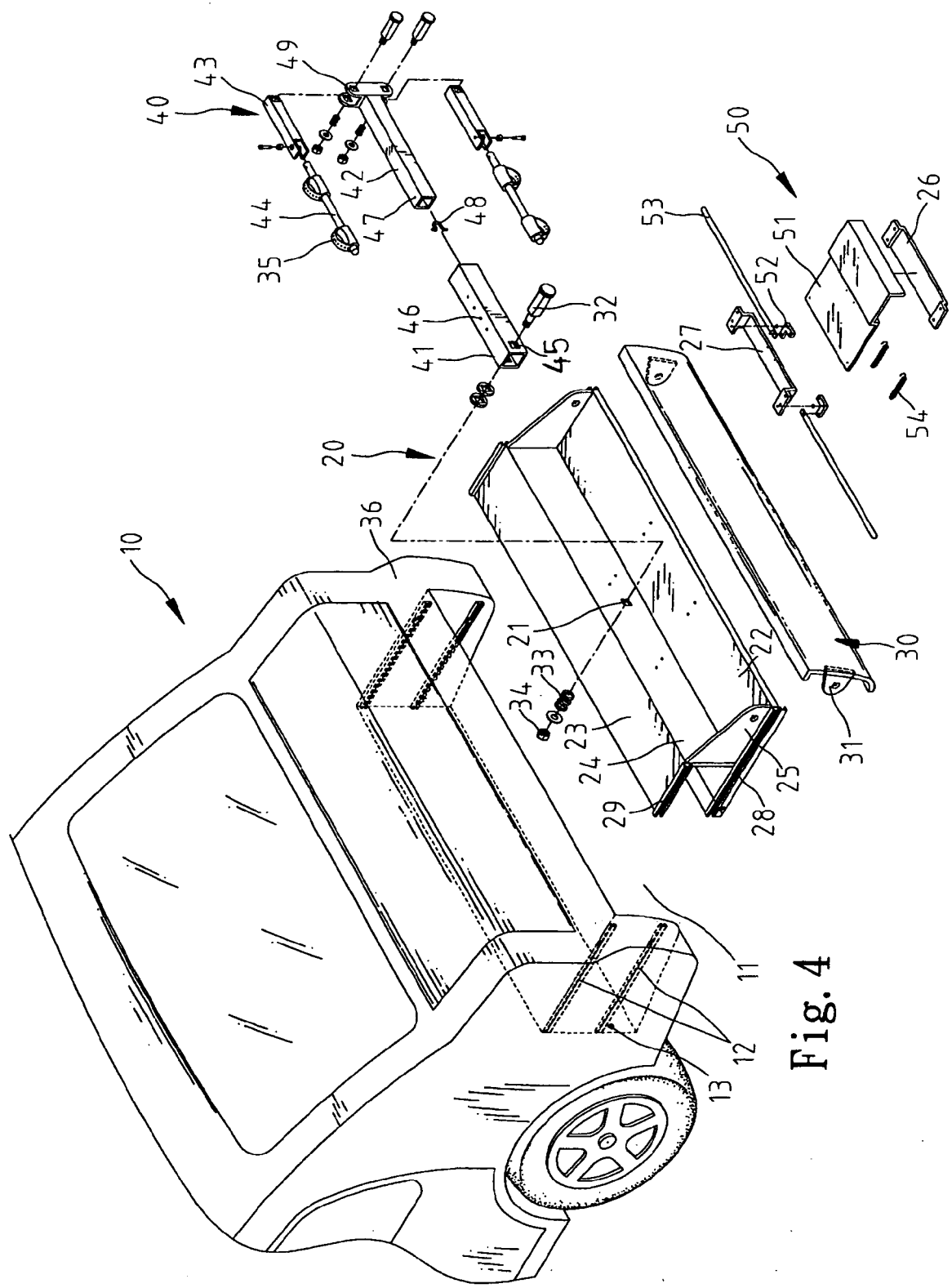
FIG. 4 is an exploded view of the bicycle-holding apparatus shown in FIG. 1.

Referring to FIG. 4, the bicycle-holding apparatus includes a tray 20 and a stand 40. The tray 20 is movably attached to the car 10. The tray 20 is concealable by the bumper shell 36 and a cover 30. The stand 40 is installed on the tray 20. The stand 40 is collapsible.

The car 10 includes a space 11 in the bumper shell 36 in order to receive the tray 20 and the stand 40. The space 11 includes two lateral walls (not numbered). A lower rail 12 and an upper rail 12 are attached to each lateral wall of the space 11. A passage 13 is defined through each wall of the space 11.

The tray 20 includes a lower platform 22, a higher platform 23, a wall 24 formed between the platforms 22 and 23 and two flank plates 25 for connecting the lower platform 22 with the wall 24. The lower platform 22 includes two lateral edges. A rail 28 is attached to each edge of the lower platform 22. The upper platform 23 includes two lateral edges. A rail 29 is attached to each edge of the upper platform 23. The wall 24 defines a square aperture 21. The rails 28 are engaged with the lower rails 12. The rails 29 are engaged with the upper rails 12. Thus, the tray 20 is movably attached to the car 10.

The cover 30 includes two ears 31 formed thereon. The ears 31 are attached to the flank plates 25.

The stand 40 includes a lower hollow column 41 pivotally attached to the wall 24, an upper hollow column 42 telescopically connected with the first column 41, two internal beams 43 pivotally connected with the upper column 42 and two external beams 44 pivotally connected with the internal beams 43.

A lock is used to pivotally connect the lower hollow column 41 with the wall 24. The lock includes a bolt 32, a spring 33 and a nut 34. The bolt 32 includes a square portion and a circular portion smaller than the square portion. The bolt 32 is inserted in two square apertures 45 defined in the lower hollow column 41. Moreover, the bolt 32 is inserted in the square aperture 21. The spring 33 is put around the bolt 32. The nut 34 is secured to the circular portion of the bolt 32. In a locking position, the square portion of the bolt 32 is inserted in the square apertures 45 and 21. In a releasing position, the square portion of the bolt 32 is pulled from the square aperture 21.

The lower hollow column 41 includes a row of apertures 46 defined therein. The upper hollow column 42 includes an aperture 47 defined therein: An arched spring 48 includes a first end attached to the internal side of the lower hollow column 41 and a second end inserted through the aperture 47. The second end of the arched spring 48 is made round. The second end of the arched spring 48 is inserted through a selective one of the apertures 46 in order to lock the upper hollow column 42 relative to the lower hollow column 41. The second end of the arched spring 48 can be pushed into the selective one of the apertures 46 in order to allow sliding of the upper hollow column 42 relative to the lower hollow column 41.

Two pairs of ears 49 are attached to the upper hollow column 42. Each internal beam 43 is pivotally connected with a related one of the pairs of ears 49 by a lock substantially identical to the lock including the bolt 32, the spring 33 and the nut 34.

Each internal beam 43 includes a pair of ears (not numbered). Each external beam 44 is pivotally connected with the pair of ears of a related one of the internal beams 43 by a lock substantially identical to the lock including the bolt 32, the spring 33 and the nut 34. Two straps 35 are attached to related one of the external beams 44.

A lock 50 is used to lock the tray 20 to the car 10. The lock 50 includes a handle 51 movably attached to the lower platform 22, two angle irons 52 pivotally connected with the handle 51 and two latches 53 pivotally connected with the angle irons 52. Pulling of the handle 51 causes sliding of the latches 53. In a locking position, the latches 53 are inserted into the apertures 13. In a releasing position, the latches 53 are removed from the apertures 13. The handle 51 includes a lower portion and an upper portion. Attached to the lower platform 22 is a strip 26 for supporting the upper portion of the handle 51. Attached to the lower platform 22 is a strip 27 for carrying the lower portion of the handle 51. Two springs 54 are provided between the handle 51 and the strip 27 in order to move the handle 51 towards the strip 27.

Figure 5:
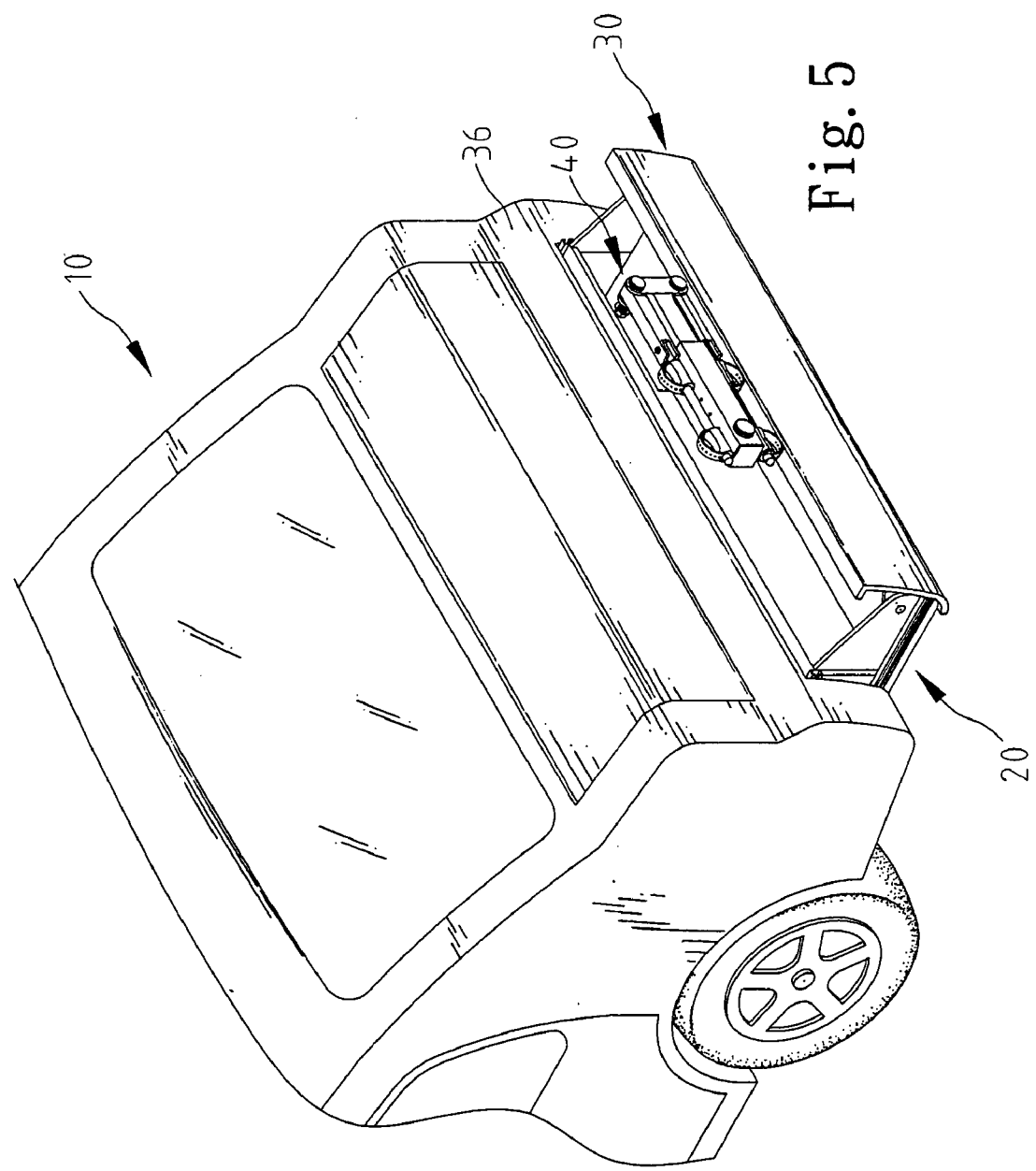
FIG. 5 is a perspective view of the bumper shell shown in FIG. 1 opened and the bicycle-holding apparatus exposed.
Figure 6:
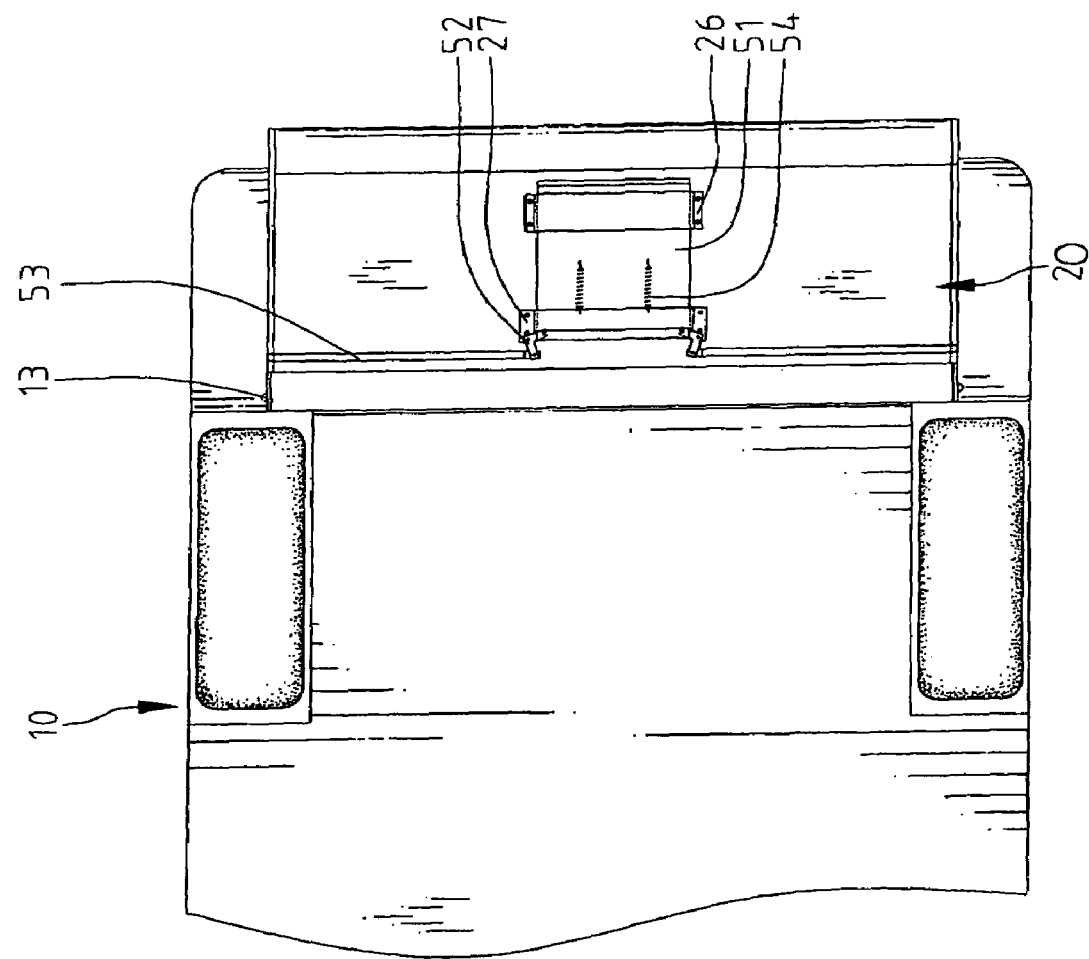
FIG. 6 is a bottom view of a rear portion of the car shown in FIG. 5.
Figure 7:
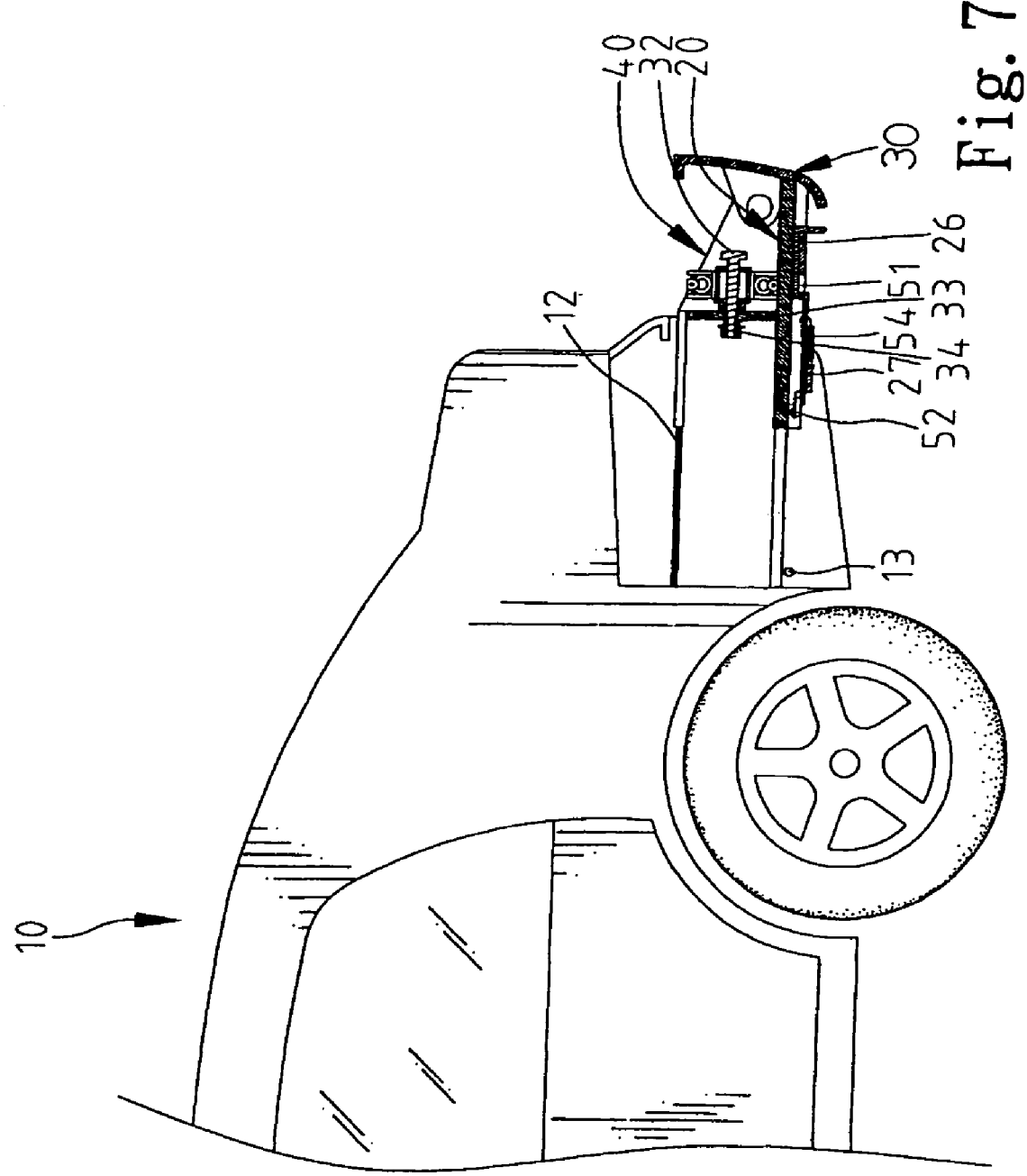
FIG. 7 is a cross-sectional view of the portion of the car shown in FIG. 6.

Referring to FIGS. 5 through 7, the tray 20 is pulled from the bumper shell 36 so as to expose the stand 40. The stand 40 is collapsed.

Figure 8:
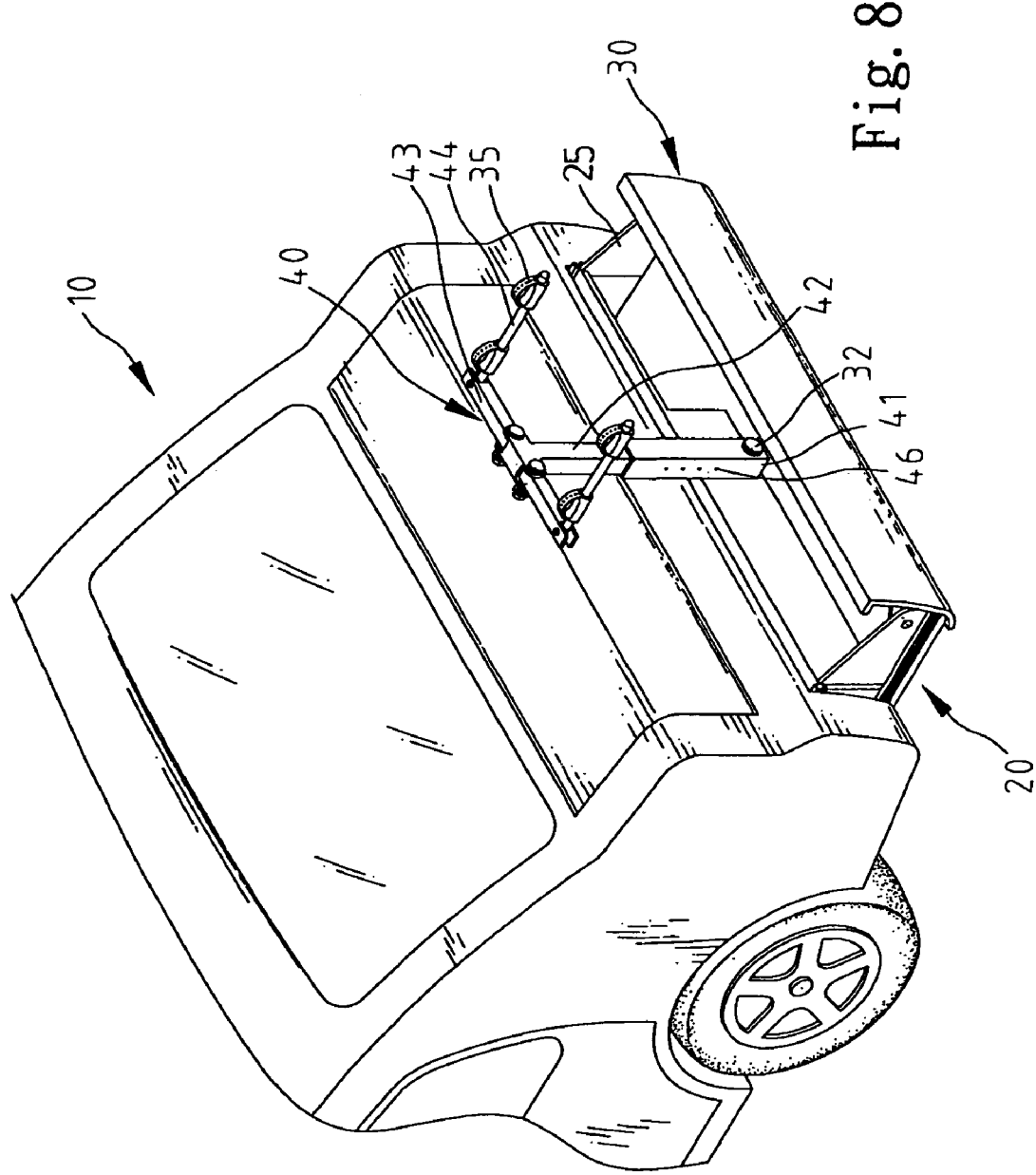
FIG. 8 is a perspective view of the bicycle-holding apparatus shown in FIG. 5 extended.
Figure 9:
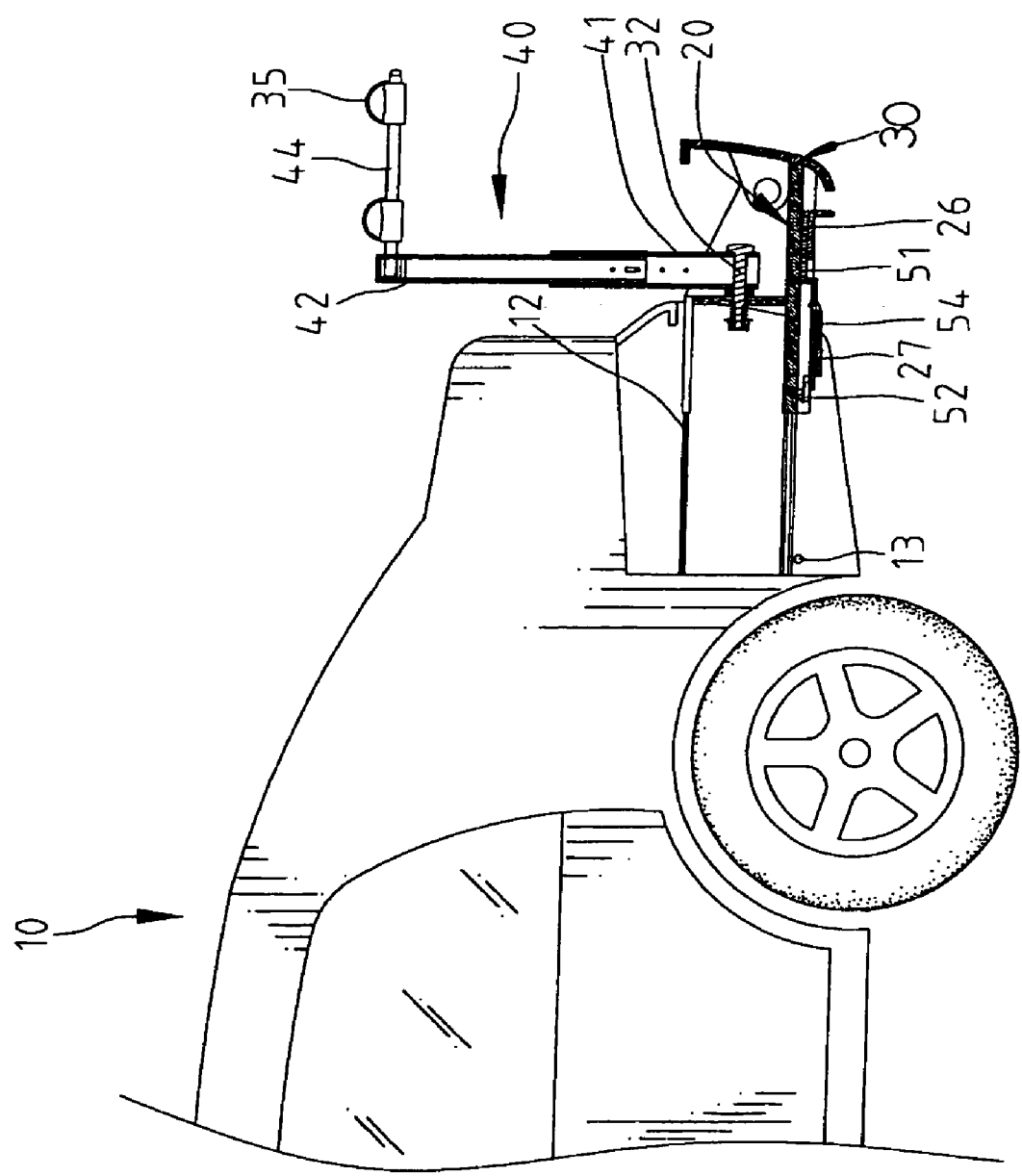
FIG. 9 is a cross-sectional view of the bicycle-holding apparatus shown in FIG. 8.

Referring to FIGS. 8 and 9, the stand 40 is extended.

Figure 10:
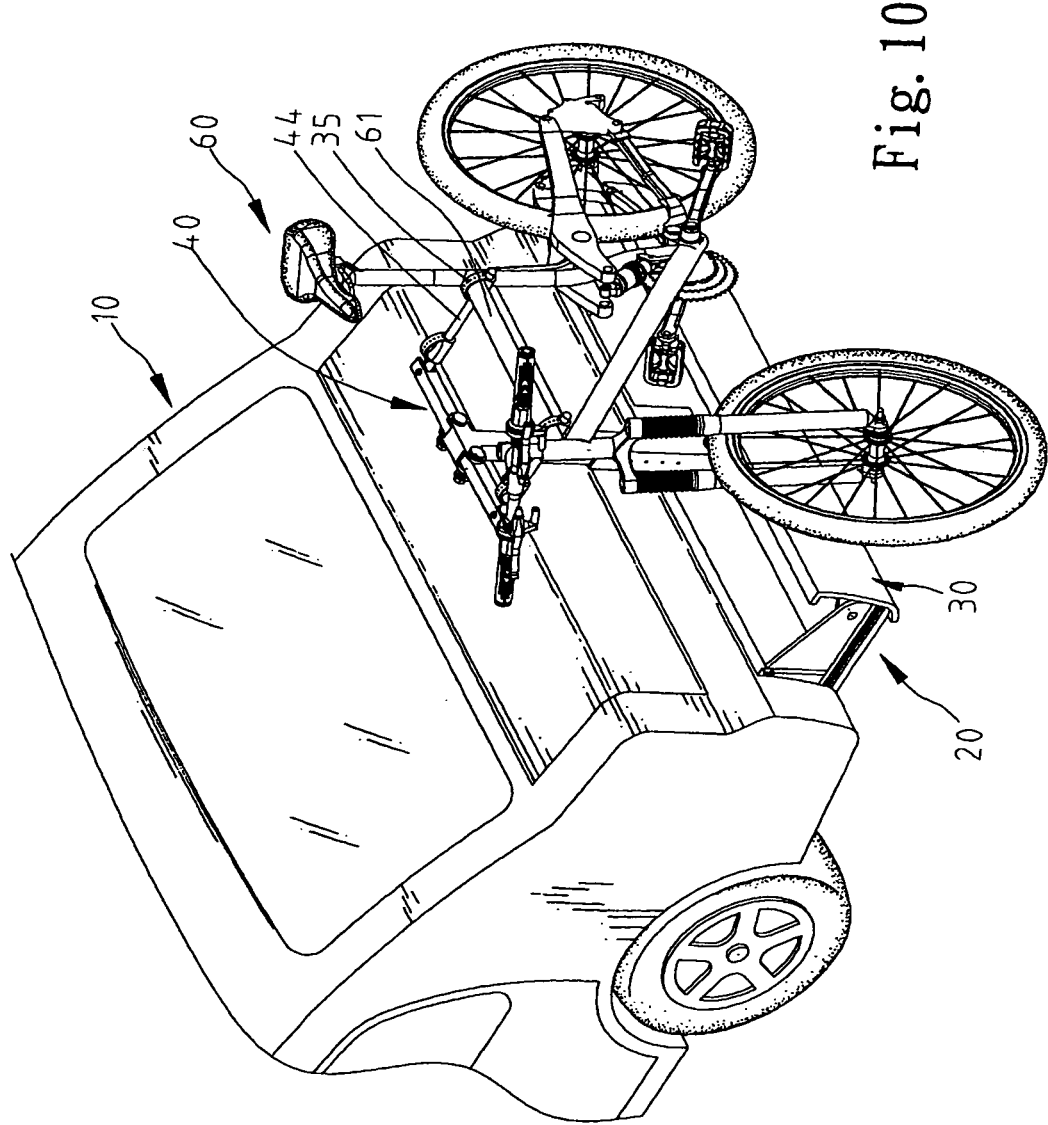
FIG. 10 is perspective view of the bicycle-holding apparatus shown in FIG. 8 supporting a bicycle.

Referring to FIG. 10, a bicycle 60 is supported on the stand 40. An upper tube 61 of the bicycle 60 is supported on the external beams 44. The upper tube 61 is retained on the external beams 44 by the straps 35.

Figure 11:
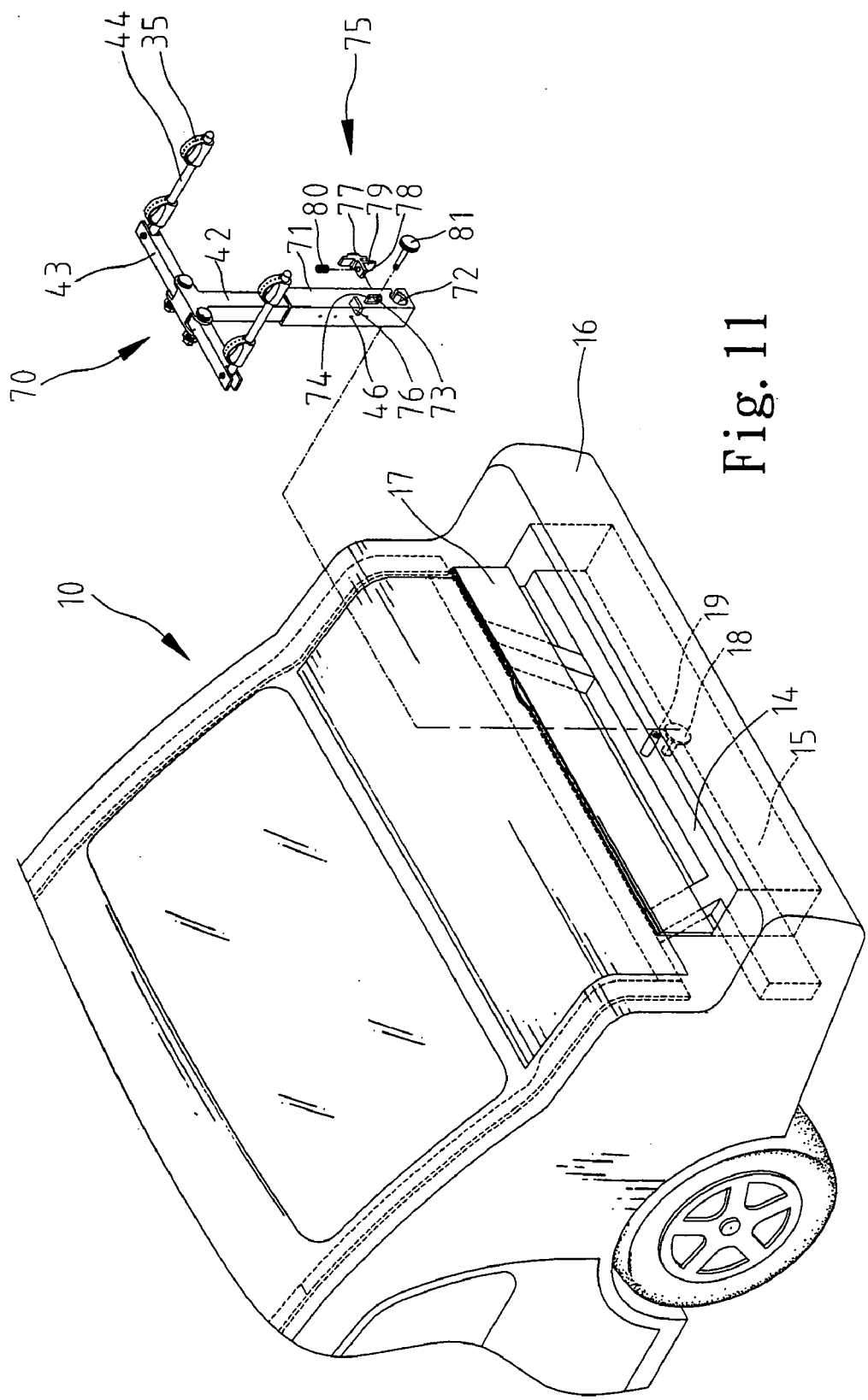
FIG. 11 is a perspective view of a rear portion of a car and a bicycle-holding apparatus according to a second embodiment of the present invention.
Figure 12:
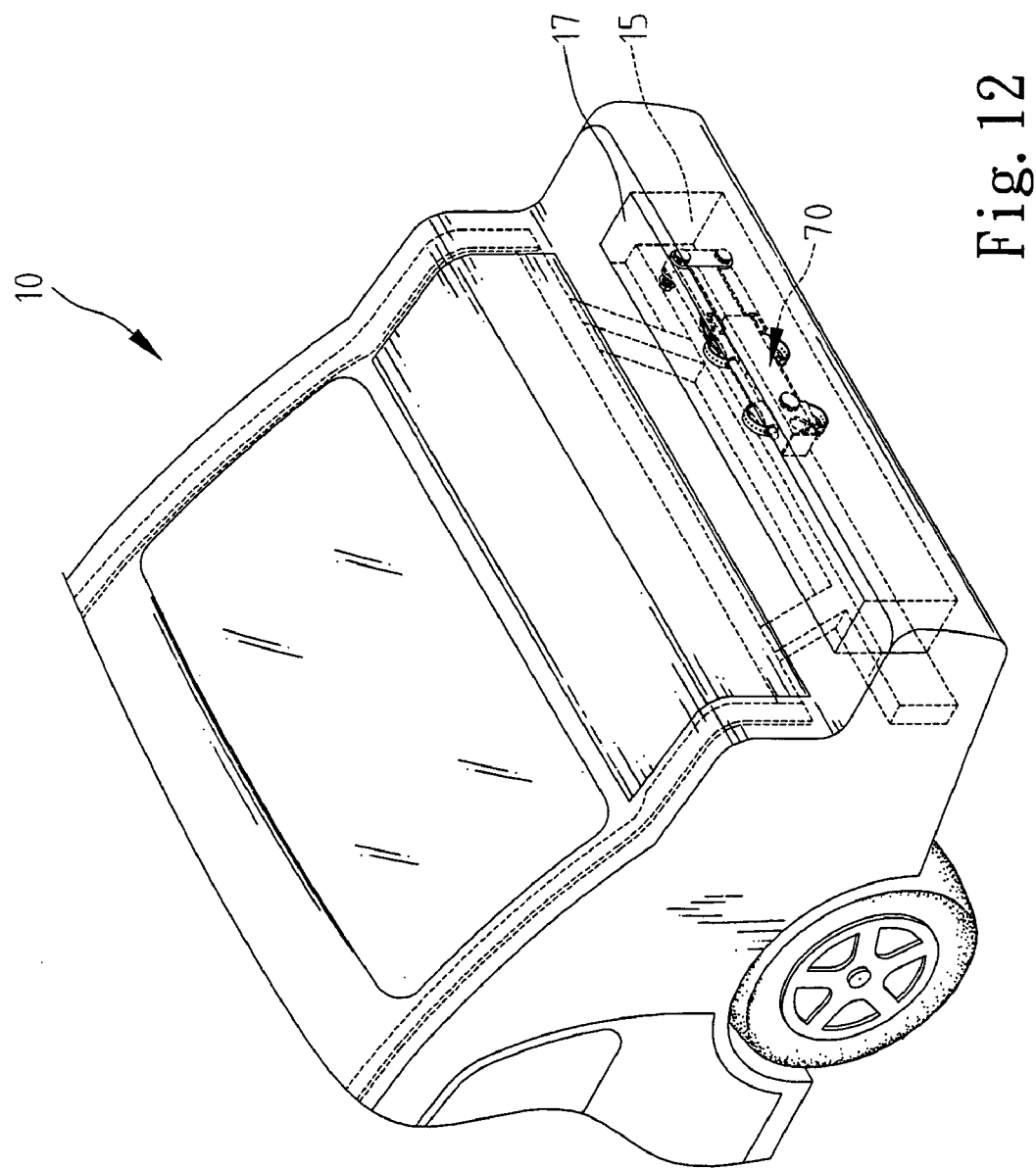
FIG. 12 is a perspective view of the bicycle-holding apparatus collapsed and concealed in the bumper shell shown in FIG. 11.
Figure 13:
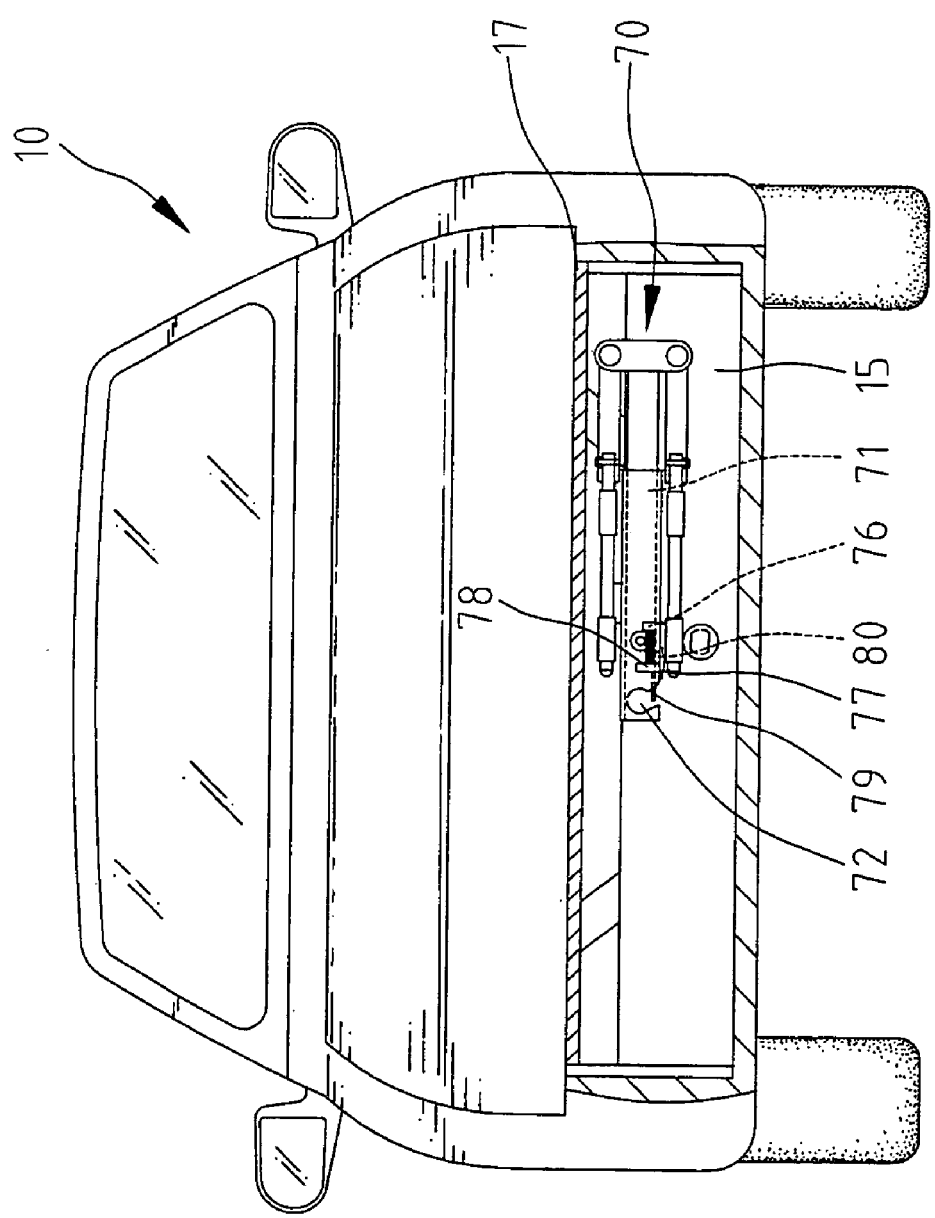
FIG. 13 is a cutaway rear view of the car shown in FIG. 12.
Figure 14:
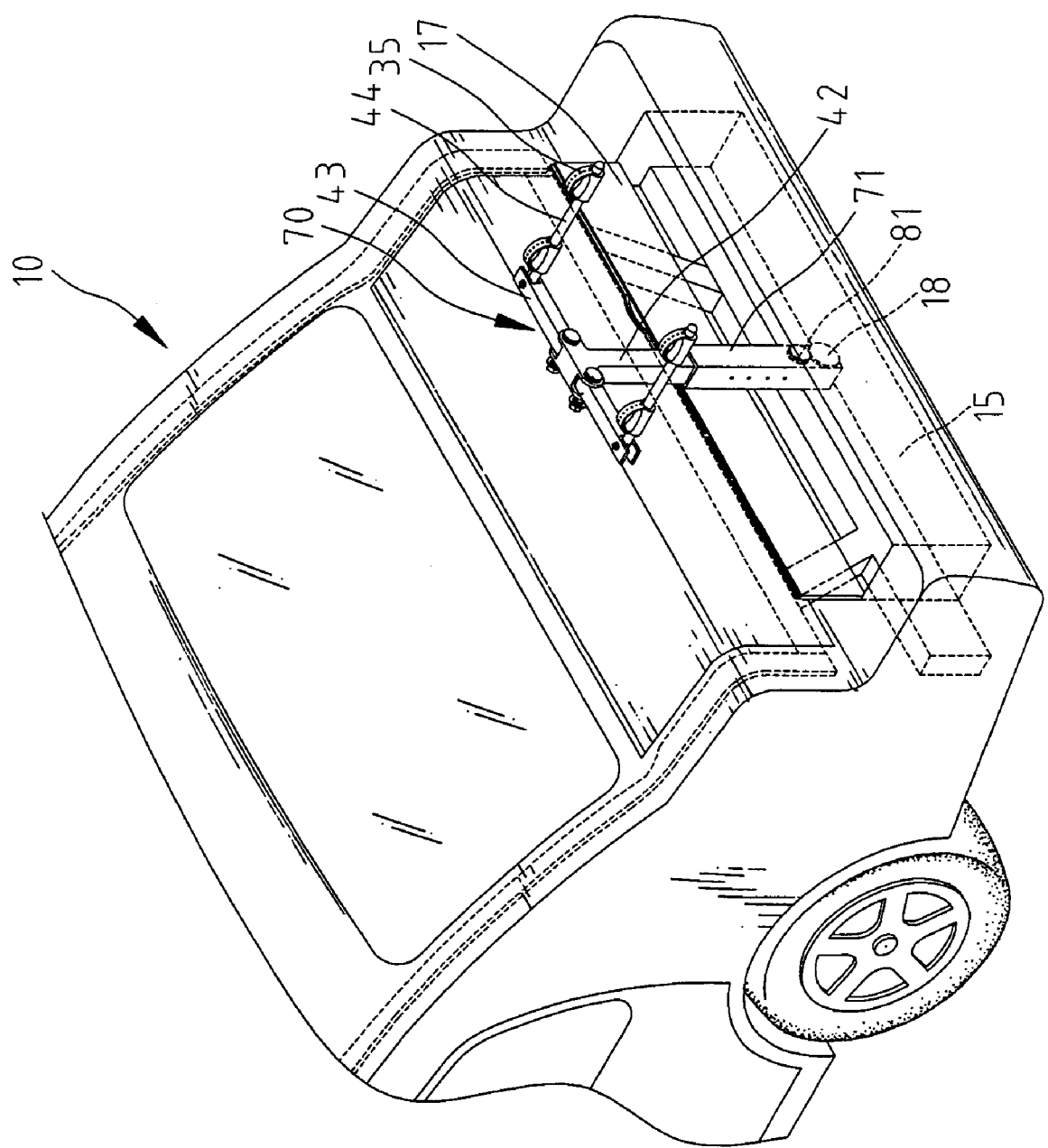
FIG. 14 is a perspective view of the bicycle-holding apparatus extended and exposed from the bumper shell shown in FIG. 11.
Figure 15:
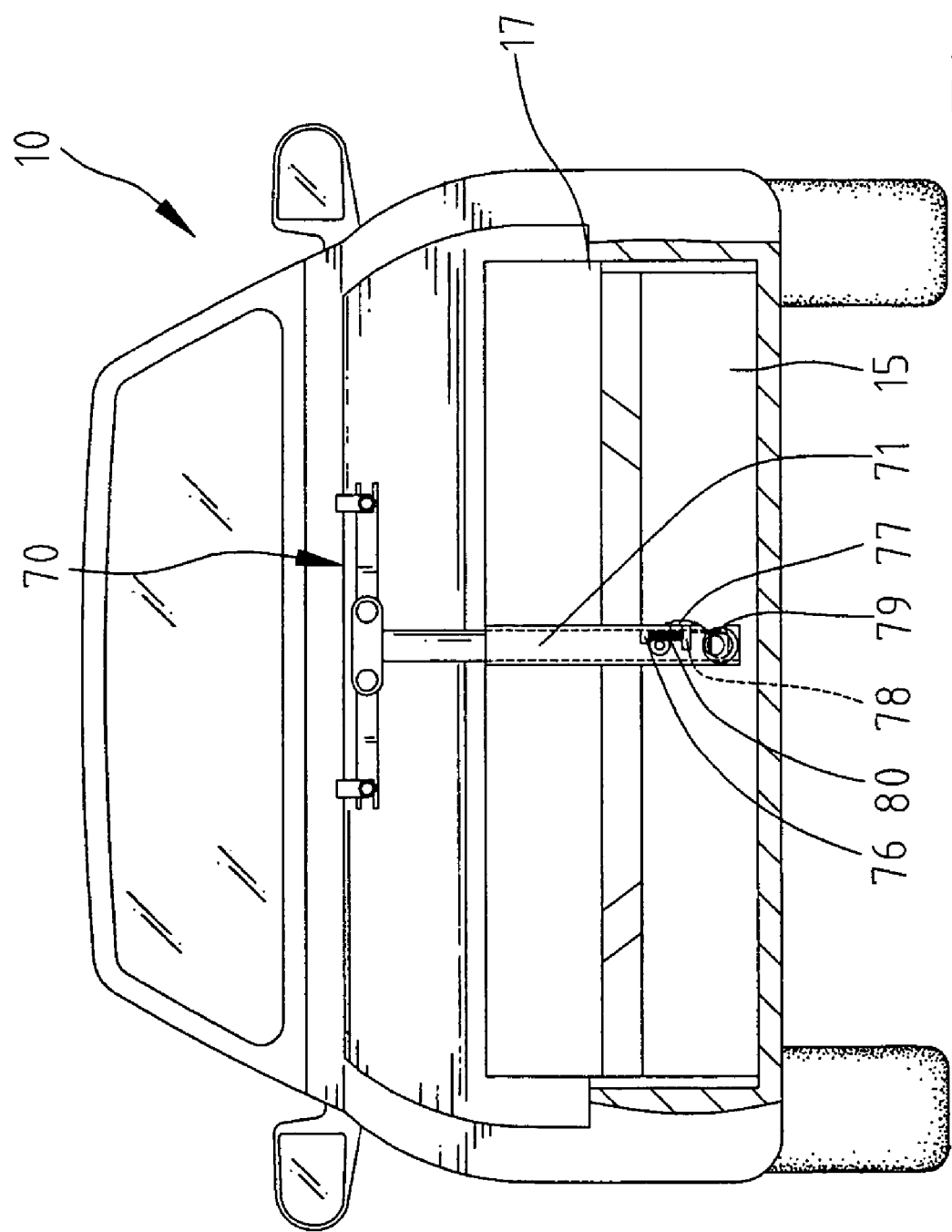
FIG. 15 is a cutaway rear view of the car shown in FIG. 14.
Figure 16:
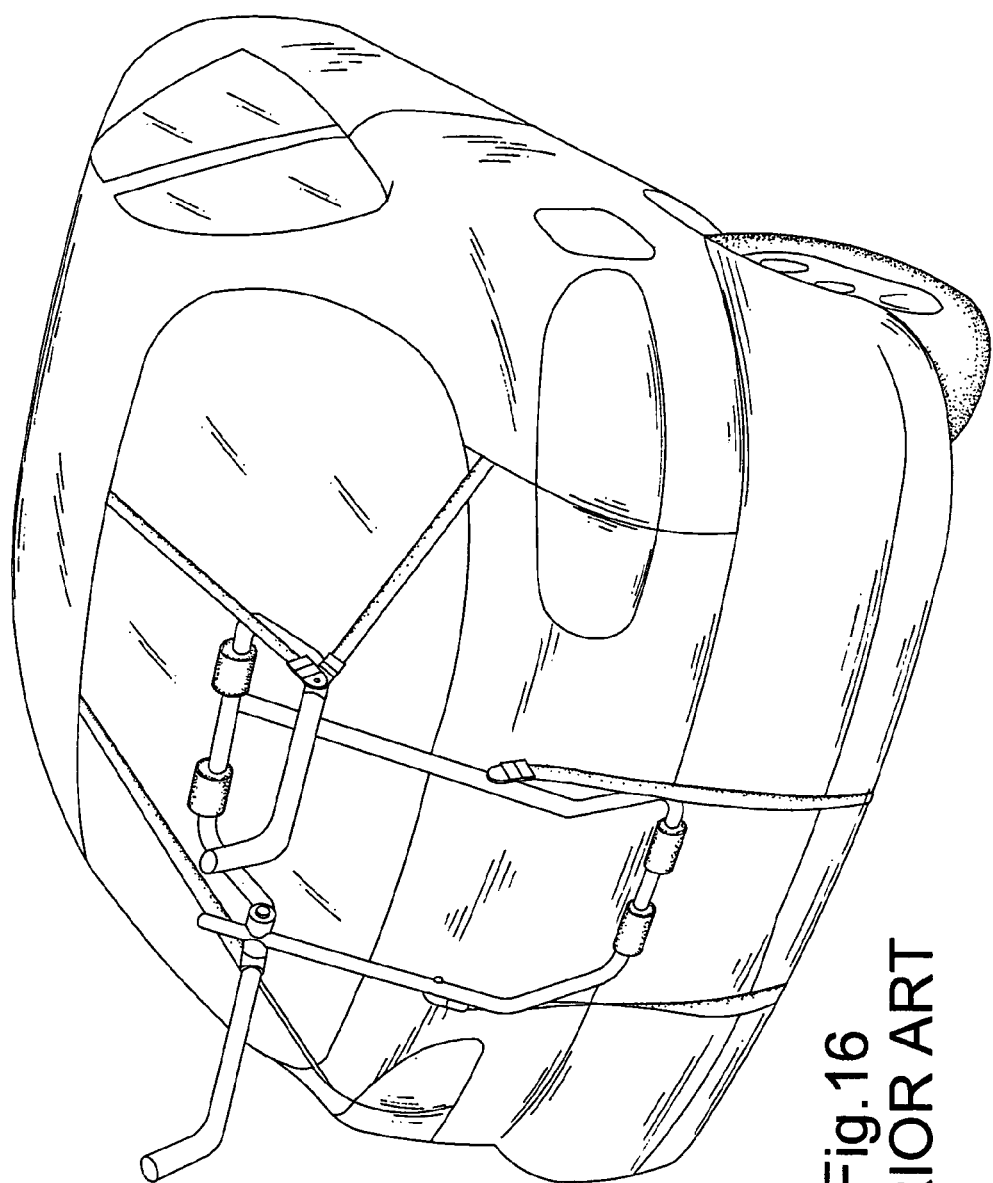
FIG. 16 is a perspective view of a conventional bicycle stand carried on the tail of a car.
Figure 17:
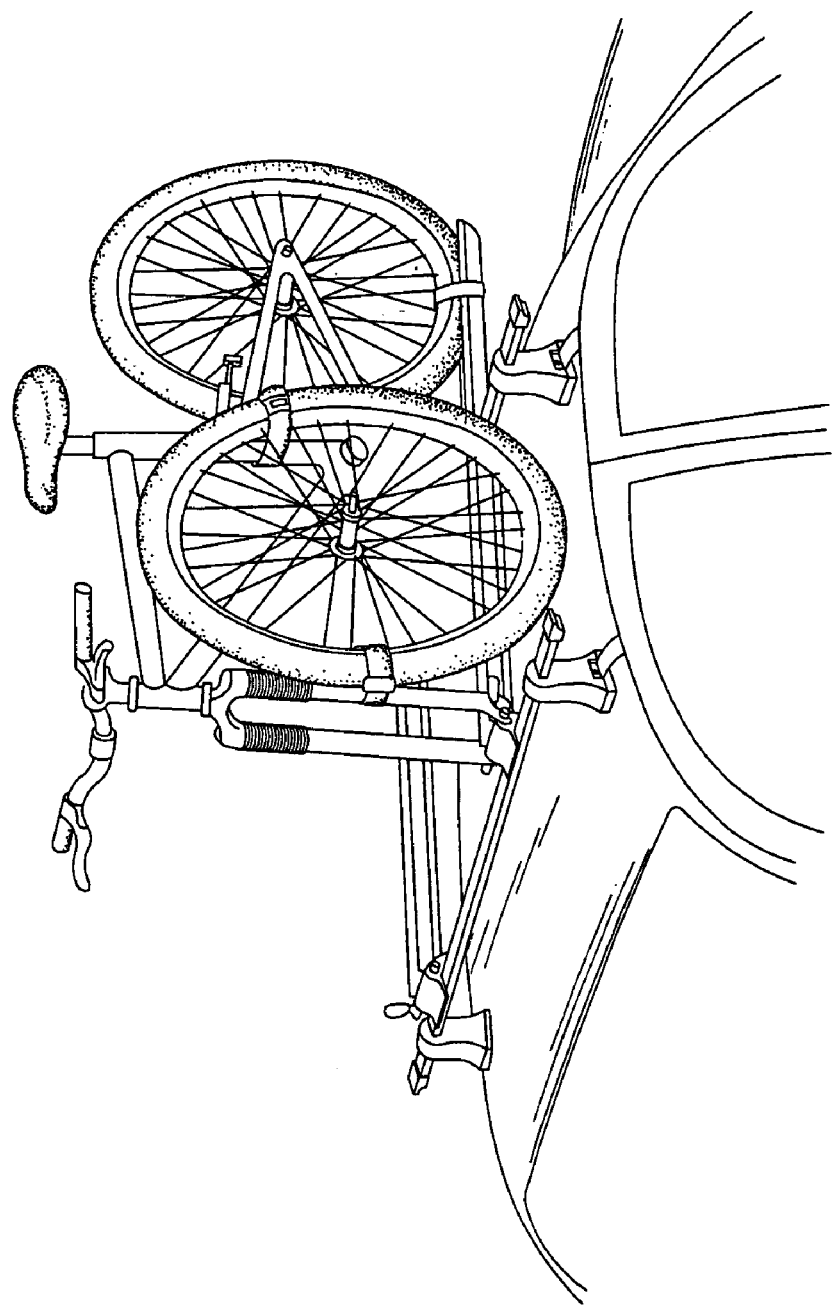
FIG. 17 is a perspective view of a conventional bicycle stand carried on the top of a car.

Referring to FIG. 11, a bicycle-holding apparatus is concealable in a bumper shell 16 of a car 10 according to a second embodiment of the present invention. The second embodiment is different from the first embodiment in several points. Firstly, the second embodiment includes a crossbar 14 instead of the tray 20 of the first embodiment. The crossbar 14 remains still during the operation thereof.

Secondly, the second embodiment includes a stand 70 instead of the stand 40 of the first embodiment. The stand 70 is different from the stand 40 in including a lower hollow column 71 instead of the lower hollow column 41. The lower hollow column 71 includes two apertures 73 defined therein. A bolt 81 is inserted into a receptacle 19 formed on the crossbar 14 through the apertures 73. Thus, the stand 70 is pivotally connected with the crossbar 14. The lower hollow column 71 includes a cutout 72 defined therein for receiving a rod 18 formed on the crossbar 14 in an upright position thereof.

Thirdly, a shutting device 75 is used to close the cutout 72 in order for the lower hollow column 71 to remain in the upright position. The shutting device 75 includes a switch 77, a tab 78 extending from the switch 77 and a gate 79 extending from the tab 78. The tab 78 and the gate 79 are put in the lower hollow column 71 through a slot 74 defined in the lower hollow column 71. By maneuvering the switch 77, the gate 79 is switched between a shutting position and an opening position. In the shutting position, the gate 79 shuts the cutout 72. A spring 80 is provided between the tab 78 and a tab 76 formed on the internal side of the lower hollow column 71.

The bumper shell 16 defines a space 15 for receiving the crossbar 14 and the stand 70. The space 15 can be shut by a cover 17 pivotally connected with the bumper shell 16.

The present invention has been described via detailed illustration of two embodiments. Those skilled in the art can derive variations from the embodiments without departing from the scope of the present invention. Therefore, the embodiments shall not limit the scope of the present invention defined in the claims.

What is claimed is:

1. A bicycle-holding apparatus concealable in a bumper shell, wherein the bicycle-holding apparatus can be switched between a concealed position where it is collapsed and concealed in the bumper shell and an exposed position where it is exposed from the bumper shell and can be extended in order to hold a bicycle, with the bicycle-holding apparatus comprising a pivotal holder, wherein the holder can be switched between a collapsed position and an extended position, wherein the holder comprises a pivotal lower hollow column, an upper hollow column telescopically connected with the lower hollow column, two internal beams pivotally connected with the upper hollow column and two external beams each pivotally connected with related one of the internal beams, with the bicycle-holding apparatus further comprising a tray movable between the concealed position and the exposed position, with the lower hollow column of the holder pivotally connected with the tray.

2. The bicycle-holding apparatus according to claim 1 comprising a cover attached to the tray for concealing the tray and the holder in the concealed position.

3. The bicycle-holding apparatus according to claim 1 wherein the holder comprises at least one strap attached to each of the internal beams for fastening the bicycle.

4. The bicycle-holding apparatus according to claim 1 wherein the tray comprises a wall formed thereon, wherein the lower hollow column is pivotally connected with the wall.

5. The bicycle-holding apparatus according to claim 4 wherein the holder comprises a lock for locking the lower hollow column to the wall.

6. The bicycle-holding apparatus according to claim 5 wherein the wall defines a square aperture, wherein the lower hollow column defines two square apertures, wherein the lock comprises a bolt with a circular portion and a square portion thicker than the circular portion, wherein the bolt can be moved between a locking position where the square portion thereof is put in the square apertures of the lower hollow column and the square aperture of the wall and a releasing position where the square portion thereof is removed from the square aperture of the wall.

7. The bicycle-holding apparatus according to claim 6 wherein the lock comprises a nut engaged with the circular portion of the bolt for keeping the lower hollow column on the wall.

8. The bicycle-holding apparatus according to claim 7 wherein the lock comprises a spring compressed between the nut and the wall for biasing the square portion of the bolt into the square aperture of the wall.

9. The bicycle-holding apparatus according to claim 1 wherein the upper hollow column is partially inserted in the lower hollow column.

10. The bicycle-holding apparatus according to claim 9 wherein the lower hollow column defines a plurality of apertures, wherein the upper hollow column defines an aperture, wherein the holder comprises an arched spring with a first end secured to the internal side of the upper hollow column and a second end that can be inserted into selected one of the apertures of the lower hollow column through the aperture of the upper hollow column.

11. The bicycle-holding apparatus according to claim 10 wherein the second end is a round end.

12. The bicycle-holding apparatus according to claim 1 comprising a lock for locking the tray to the bumper shell.

13. A bicycle-holding apparatus concealable in a bumper shell, wherein the bicycle-holding apparatus can be switched between a concealed position where it is collapsed and concealed in the bumper shell and an exposed position where it is exposed from the bumper shell and can be extended in order to hold a bicycle, with the bicycle-holding apparatus comprising a pivotal holder, wherein the holder can be switched between a collapsed position and an extended position, wherein the holder comprises a pivotal lower hollow column, an upper hollow column telescopically connected with the lower hollow column, two internal beams pivotally connected with the upper hollow column and two external beams each pivotally connected with related one of the internal beams, wherein the upper hollow column comprises two pairs of ears each pivotally connected with related one of the internal beams.

14. The bicycle-holding apparatus according to claim 13 wherein the holder comprises a lock for locking each of the internal beams to related one of the pairs of ears of the upper hollow column.

15. The bicycle-holding apparatus according to claim 13 further comprising a crossbar, with the holder pivotally connected with the crossbar.

16. The bicycle-holding apparatus according to claim 13 wherein the holder comprises a lock for locking each of the internal beams to related one of the pairs of ears of the upper hollow column.

17. A bicycle-holding apparatus concealable in a bumper shell comprising a fray movable between a concealed position and an exposed position; a holder pivotally connected with the tray, wherein the holder can be switched between a collapsed position and an extended position, wherein the bicycle-holding apparatus can be switched between the concealed position where it is collapsed and concealed in the bumper shell and the exposed position where it is exposed from the bumper shell and can be extended in order to hold a bicycle; and a lock for locking the tray to the bumper shell, wherein the lock comprises two latches attached to the tray and movable between a locking position where the latches are inserted in two apertures defined in the bumper shell and a releasing position where the latches are removed from the apertures defined in the bumper shell.

18. The bicycle-holding apparatus according to claim 17 wherein the lock comprises two angle irons each connected with related one of the latches and a handle connected with the angle irons so that the movement of the handle causes the movement of the latches through the angle irons.

19. The bicycle-holding apparatus according to claim 18 wherein the lock comprises at least one strip attached to the tray for carrying the handle.

20. The bicycle-holding apparatus according to claim 15 wherein the lower hollow column is pivotally connected with the crossbar.

21. The bicycle-holding apparatus according to claim 20 comprising a receptacle formed on the crossbar and a bolt driven into the receptacle through two apertures defined in the lower hollow column.

22. The bicycle-holding apparatus according to claim 20 wherein the holder comprises at least one strap attached to each of the internal beams for fastening the bicycle.

23. The bicycle-holding apparatus according to claim 20 comprising a rod formed on the crossbar, wherein the lower hollow column defines a cutout for receiving the rod in the extended position.

24. The bicycle-holding apparatus according to claim 23 comprising a shutting device for shutting the cutout.

25. The bicycle-holding apparatus according to claim 24 wherein the lower hollow column defines a slot, wherein the shutting device comprises a switch movable on the lower hollow column, a tab extending into the lower hollow column from the switch through the slot and a gate extending from the tab for shutting the cutout.

26. The bicycle-holding apparatus according to claim 25 wherein the shutting device comprises a spring for biasing the tab.

27. The bicycle-holding apparatus according to claim 26 wherein the lower hollow column comprises a tab formed therein for abutting the spring.

28. The bicycle-holding apparatus according to claim 20 wherein the upper hollow column is partially inserted in the lower hollow column.

29. The bicycle-holding apparatus according to claim 28 wherein the lower hollow column defines a plurality of apertures, wherein the upper hollow column defines an aperture, wherein the holder comprises an arched spring with a first end secured to the internal side of the upper hollow column and a second end that can be inserted into selected one of the apertures of the lower hollow column through the aperture of the upper hollow column.

30. The bicycle-holding apparatus according to claim 29 wherein the second end is a round end.

* * * * *